Oct. 2, 1945.  R. C. HOYT  2,385,812
VEHICLE BRAKE
Filed March 28, 1941  6 Sheets-Sheet 1

Inventor
Roy C. Hoyt
By Merchant & Merchant
Attorneys

Oct. 2, 1945.  R. C. HOYT  2,385,812
VEHICLE BRAKE
Filed March 28, 1941  6 Sheets-Sheet 2

Inventor
By Roy C. Hoyt
Merchant & Merchant
Attorneys

Oct. 2, 1945.          R. C. HOYT              2,385,812
                      VEHICLE BRAKE
        Filed March 28, 1941        6 Sheets-Sheet 3

Fig. 6.

Inventor
By Roy C. Hoyt
Merchant & Merchant
Attorneys

Oct. 2, 1945.  R. C. HOYT  2,385,812
VEHICLE BRAKE
Filed March 28, 1941  6 Sheets-Sheet 5

Inventor
Roy C. Hoyt
By Merchant & Merchant
Attorneys

Fig. 14.

Patented Oct. 2, 1945

2,385,812

UNITED STATES PATENT OFFICE 2,385,812

VEHICLE BRAKE

Roy C. Hoyt, Duluth, Minn.

Application March 28, 1941, Serial No. 385,720

26 Claims. (Cl. 188—152)

My present invention relates to improved methods of operating friction brake mechanisms and to improvements in friction brake mechanisms and mechanisms for operating the latter, and although these methods and mechanisms are well adapted for application in connection with friction brakes employed for a wide range of uses, they are advantageous in connection with and are herein illustrated with brakes of the type employed in automobiles, trucks, busses and like vehicles.

Among the important objects of the invention is the provision of a brake mechanism in which a minimum of applied pressure and movement is required to produce a maximum of brake efficiency.

Another important object of the invention is the provision of a brake in which the energy frictionally imposed upon one of the relatively non-rotary friction elements thereof by a relatively rotary friction element thereof is transferred on a modified basis to another relatively non-rotary friction element of the brake, and this modified energy is employed as an actuating force for energizing the latter friction element.

Still another object of the invention is a provision of a brake mechanism incorporating a plurality of brakes and in which the energy frictionally applied to one or more of the friction elements of the brake is transferred to and utilized as a source of energizing power for another brake or set of brakes.

Still another object of the invention is a provision of a novel mechanism for coupling together two shoes of a brake and individually adjustably positioning the adjacent coupled ends of opposite shoes when in an inoperative or retired position.

Preferably and in the form of the invention disclosed in the accompanying drawings, the above and numerous other highly important objects and advantages of the invention are achieved through the use of hydraulic linkage, but I do not intend to be limited to any specific instruments or methods except as defined in the appended claims.

The improved methods and the above and other important objects of the invention will be made clear in the accompanying drawings, specifications, and claims.

In the accompanying drawings like characters indicate like parts throughout the several views.

Referring to the drawings.

The form of mechanism illustrated in Figures 1 to 5 inclusive will first be described. In these figures a stationary backing plate is indicated by 15. This backing plate 15 may be assumed to be co-axial with and carried by the axle of a vehicle's wheel, not shown, and serves as a medium for mounting other parts of the brake mechanism. A brake drum which may be assumed to be of the conventional character and carried by a vehicle's wheels, not shown, is indicated by 16.

Mounted within the brake drum 16 in circumferentially spaced opposed relation is a pair of like segmental brake shoes 17 that are provided with suitable friction facings 18. The friction drum and facing equipped shoes 17 may hereinafter be referred to respectively as the rotary and non-rotary friction elements of the brake. Disposed within the brake drum 16 between the adjacent upper ends of the opposed friction shoes 17 is a primary hydraulic fluid pressure cylinder 19 that is securely anchored to the backing plate 15 through the medium of cap screws or the like 20 (see Figure 1). Working in opposite end portions of the primary cylinder 19 are projectable and retractable pistons 21 that are equipped at their inner ends with resilient sealing cups 22 of conventional character. The sealing cup equipped inner ends of the pistons 21 are always spaced apart sufficiently to afford within the intermediate portion of the cylinder 19, a fluid pressure chamber 23. The outer ends of pistons 21 are provided with integrally formed radially projecting heads 24 that normally engage the outer ends of the cylinder 19 and thereby limit retraction of the pistons 21. For the purpose of positively maintaining the sealing cups 22 in position against the ends of their respective pistons there is provided, within the intermediate portion of the cylinder 19, a light compression spring 25 that reacts against each of the opposed sealing cups.

For connecting the head equipped ends of the pistons 21 to their respective adjacent ends of the opposite friction shoes 17, the shoes 17 are provided with articulating links 26 that are pivotally anchored thereto, through the medium of pins or the like 26a. It is here important to note that, in cross section, the shoes 17 are T shaped and that the articulating links 26 are anchored to the radial flanges of the shoes 17 and conform to the circular contour of the inner portions of the axially projected flanges of the shoes. In the normal or retracted positions of the shoe the articulating links bear against the axial flanges of the shoes as shown, for example, in Figure 3. The inner projecting ends of the articulating links 26 are rounded and work in milled slots 27 in the heads 24 of the pistons 21.

Figure 3:
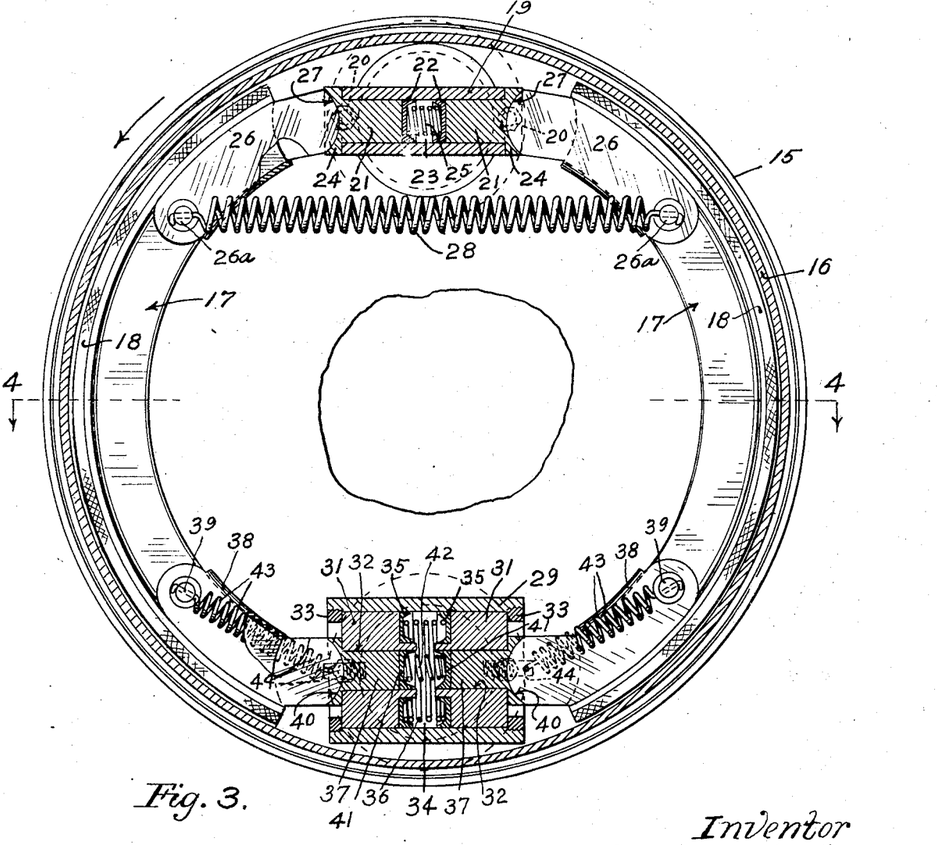
Fig. 3 is a sectional view, with some parts broken away, taken on the line 3—3 of Fig. 2 and rotated 90° in a counterclockwise direction.
Figure 4:
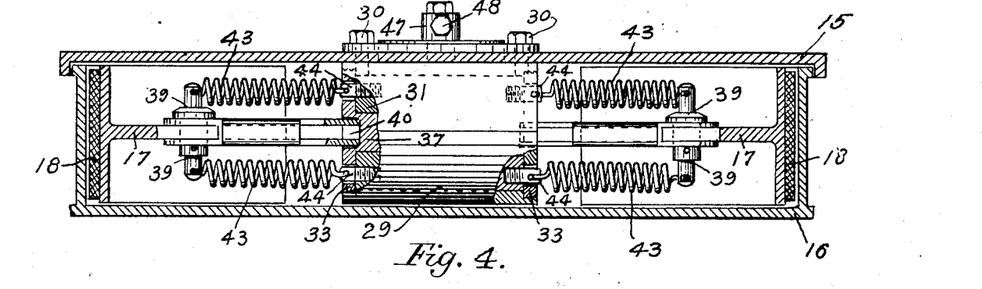
Fig. 4 is a sectional view, with some parts broken away, taken on line 4—4 of Fig. 3.

Preferably, and as illustrated, the articulating links are U shaped in cross section and work over and engage opposed sides of the radial flanges of the shoes 17 (see Figures 3 and 4). The upper end portions of the opposed shoes 17 are normally held retracted away from the drum, to the maximum extent permitted by engagement of the piston heads 24 with the ends of the cylinder 21, by a coil tension spring 28 that is anchored at its opposed ends in the projected ends of the pins 26a.

Mounted within the lower portion of the brake drum 15 and disposed between the adjacent lower ends of the shoes 17 is a secondary cylinder 29 that is, as illustrated, of considerably greater diameter than that of the primary cylinder 19. This secondary cylinder 29 is rigidly anchored to the backing plate 15 through the medium of suitable cap-screws or the like 30. Mounted within opposed end portions of the large diameter secondary cylinder 29, is a pair of large diameter pistons 31, each of which is axially bored to provide a cylinder 32 of relatively smaller diameter as compared to that of pistons 31. Outward movements of the large diameter pistons 31 in the secondary cylinder 29 are definitely limited, by radially projecting stop shoulders afforded by annular rings 33 that are screw threaded into opposite end portion of the secondary cylinder. The stop rings 33 may be axially adjusted through screw threaded action to vary the retracted positions of the shoes 17 with respect to the drum. The inner ends of the large diameter pistons 31 are spaced apart to afford a fluid pressure chamber 34 within the intermediate portion of the cylinder 29, and at their inner ends the large diameter pistons are equipped with resilient annular sealing cups 35. The sealing cups are held in position against the ends of their respective large diameter pistons 31 through the medium of a compression spring 36. Working within each of the secondary piston cylinders 32 is a head equipped piston 37 that is similar in character to the primary pistons 21. The cylinder pistons 37 are operatively connected to adjacent end portions of the opposed shoes through the medium of articulating links 38 that are like the articulating links 26 and are connected to the shoes 17 by pins 39. The rounded inner ends of the articulating links 38 seat in milled slots 40 in the heads of the pistons 37. The inner ends of the pistons 37 are provided with suitable resilient sealing cups 41 that are held in place against ends of the pistons 37 by a relatively light interposed compression spring 42. For retracting the lower ends of the shoes 17 there is provided pairs of tension springs 43. The outer ends of opposite springs 43 of each pair thereof are anchored to their co-operating shoe 17 through the medium of opposite projecting ends of a pivot pin 39, and the inner end of each spring 43 of each pair thereof, is anchored to an adjacent large diameter secondary piston 31 through the medium of eye bolt 44. The eye bolt 44 is illustrated in Figure 4 as being screw threaded through the large diameter pistons 31 of the secondary cylinder.

For admission of fluid pressure to the pressure chamber of the primary cylinder 19, said cylinder 19 is provided with a port 45. The compression chamber 34 of the large diameter secondary cylinder 39 is provided with a port 46.

*Operation of brake mechanisms of Figs. 1 to 4, inclusive*

Figure 1:
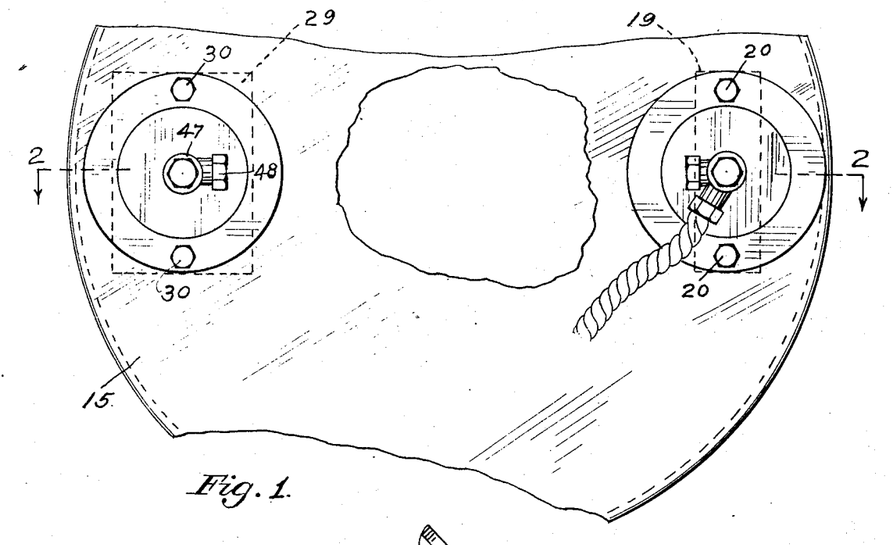
Fig. 1 is a view in side elevation, with some parts broken away, of a brake mechanism of one of a vehicle's wheels, looking from the inside toward the outside and showing the same rotated 90° in a clockwise direction with respect to its normal right side up position.
Figure 2:
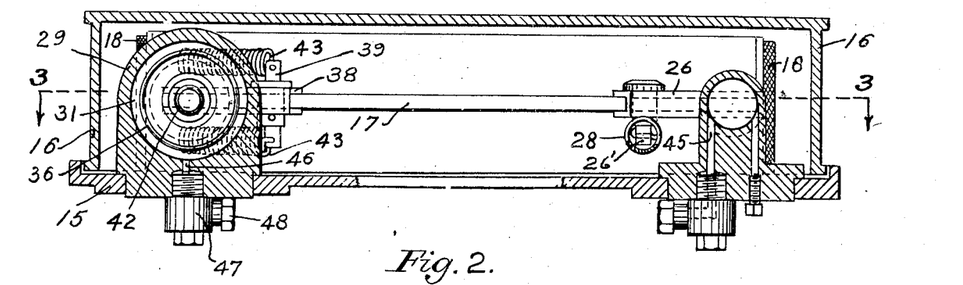
Fig. 2 is a sectional view taken on line 2—2 of Fig. 1.

Before describing the master cylinder mechanism of Fig. 5 or the preferred multiple brake hook-up of Fig. 6, it is thought well to briefly describe the operation of the mechanism described in connection with Figs. 1 to 4, inclusive, as a single unit, and for this purpose the port 46 to the pressure chamber of large diameter secondary cylinder 29 will be closed by means of a suitable fitting 47 having an opening that is closed by a plug 48 shown in Figs. 1–2 and 4. For the present, it may be assumed that the compression chamber 34 of the large diameter secondary cylinder 29 has been filled with fluid to atmospheric pressure and thereafter closed by the plug 48, and it may be further assumed that the pressure chamber of the primary cylinder 19 is connected to a suitable source of fluid pressure such as a master cylinder through connections including the port 45.

To set the brake, the operator will cause fluid pressure to be built up in the pressure chamber of the primary cylinder to a varying extent, but at least sufficient to overcome the retracting pressure of the spring 28 and cause projection of the primary pistons 21 outwardly until the upper ends of both of the friction surfaces of shoe 17 come into frictional engagement with the drum. If the direction of rotation of the drum 16 is counter clockwise, as indicated by the direction arrow in Fig. 3, the upper end of the left hand shoe 17 will operate as the toe or application end of the shoe, and the lower end, thereof, will operate as the heel or anchoring end of the shoe, and the lower end of the right hand shoe 17 will operate as the application or toe end of that shoe and the upper end of the left hand shoe will function as the heel or anchoring end of that shoe. Upon being brought into initial frictional engagement with the drum through pressure applied to the chamber of the primary brake cylinder, the left hand shoe 17 will, of course, tend to move in a counter clockwise direction under frictionally applied energy exerted, thereon, by the drum.

As a result of the initial frictional engagement between the upper end of the left hand or primary shoe and the drum, the articulating linkage to the cylinder piston 37 will move sufficiently on the pivot 39 to permit the entire friction surface of facing 18 to be brought into frictional engagement with the drum, thereby, increasing the total frictional energy picked up by the left hand or primary shoe. The total of this energy frictionally picked up by the primary left hand shoe 17 will be applied to the fluid in the compression chamber 34 of the secondary cylinder through the medium of the co-operating articulating link 38 and the left hand pistons 31 and 37, which latter, move as a unit under such counter clockwise exerted pressure.

The fluid pressure thus built up in the compression chamber 42 of the large diameter secondary cylinder will cause outward projection of the right hand smaller diameter piston-carried-piston 37 and the lower or toe end of the right hand friction shoe 17, until the latter becomes effectively stopped, it being understood that the large right hand diameter secondary piston 31 being already against the stop ring 33, cannot partake of further outward movement. Under the combined action of energy transferred to the secondary shoe from the primary shoe and energy frictionally picked up by the secondary shoe upon engagement with the rotating drum, the right hand shoe 17 will, of course, tend to rotate with the drum in a counter clockwise direction and will, in fact, partake of such rotary movement to the very limited extent necessary to move the right hand piston 21 of the primary cylinder 19 until its head 24 engages the end of said primary cylinder and serves, thereafter, as an anchor to limit further counter clockwise movement of the right hand friction shoe. Obviously, when the top or heel end of the right hand or secondary friction shoe 17 of Fig. 3 becomes anchored by engagement of the piston head 24 with the end of cylinder 19, the lower or heel end of the left hand or primary brake shoe 17 will also become effectively anchored through the medium of the secondary shoe and linkage including the compressed fluid within the chamber 34 of the secondary cylinder.

From the above, it will be apparent that the brake described is of a "self-energizing type," since the secondary or right hand shoe 17 is energized from the primary shoe by energy frictionally applied to the primary or left hand shoe 17 but attention is here directed to the fact that, whereas it is customary practice in connection with the so called "self energizing" brake to transfer the entire anchor load of a primary shoe to a secondary shoe, in the structure described, only a desired portion of the anchor load of one shoe is transferred to the other shoe. In previous brakes of the "self-energizing" type, wherein the full anchor load from one shoe was passed on to another shoe and used as a source of power for energizing the latter shoe, the latter shoe is often caused to operate under much greater pressures than the primary shoe, so that the braking load is carried to a much greater extent by the latter shoes than by the primary shoe unless different types of frictional facings are used on the different shoes. To meet this condition, manufacturers of such brakes have, in fact, been forced to employ relatively soft facings on the primary shoe to obtain a relatively high degree of braking efficiency on such shoe under relatively low actuating pressure, even at the sacrifice of long life to the facing of the primary shoe, and to use a relatively hard and less efficient friction facing on the secondary shoe.

With the brake described in connection with Figs. 1 to 4, inclusive, the secondary cylinder piston assembly serves as an energy reducing, movement increasing medium of linkage between the primary and secondary shoes and by proper proportioning of the relative areas of the large diameter secondary cylinder pistons 31 and the smaller diameter piston-carried-pistons 37, any desired percentage of the anchor load of the primary shoe can be passed on to the secondary shoe. In fact, this can, if desired, be so worked out that the energizing force exerted on the secondary friction shoe by the primary friction shoe will approximately equal the energizing force exerted on the primary shoe through the medium of applied fluid pressure in the pressure chamber of the primary cylinder 19. Hence, with the brake described, if like friction surfaces are employed on the primary and secondary shoes, each of the shoes may be made to bear approximately an equal percentage of the total friction load. This protects against undue distortion of the drum and results in substantially equal and long life to the friction surfaces of both shoes and insures smooth and controllable application of braking pressure.

To release the brake of Figs. 1 to 4, inclusive, it is merely necessary to relieve the chamber 23 of the primary cylinder 19 of brake applying pressure. Pursuant to this changed condition the left hand primary piston 24 will be retracted under the action of the spring 28, thereby retiring the toe end portion of the primary or left hand shoe 17 to its normal or retracted position, and permitting the left end pair of retracting springs 43 to retract heel end of the primary shoe 17 to the stop position of the cooperating articulating link 38. Upon retiring of the primary shoe 17 to its inoperative position, large diameter secondary piston 31 and the smaller diameter piston 37 carried thereby, will be retired as a unit to a normal inoperative position by the combined action of fluid pressure in the compression chamber 34 of the secondary cylinder and the action of the compression spring 36 of the secondary cylinder. The fluid pressure in the compression chamber 34 of the secondary cylinder 29 being now reduced to normal or approximately atmospheric pressure, the lower or toe end of right hand or secondary shoe 17, the cooperating articulating link 38 and the right hand piston-carried piston 37 will be retracted to their normal inoperative positions. Obviously, upon being relieved of energizing force and toe end frictional engagement with the drum, the upper or heel end of the secondary shoe will be retracted away from the drum by the spring 28 to the stop position of the articulating link associated therewith, thereby completing retirement of the several brake elements to normal inoperative positions.

The operation of the brake mechanism of Fig. 4 had already been described under counter clockwise rotation of the brake drum, but from inspection of the drawings, it will be apparent that mechanisms will function with equal efficiency irrespective of the direction of the rotation of the drum, the only difference being that under reverse rotation of the brake drum the right hand brake shoe of Fig. 4 functions as the primary shoe and the left hand shoe of Fig. 4 will then function as the secondary brake shoe. Also, under such reverse rotation of the brake drum, the upper end of the right hand brake shoe of Fig. 4 will function as the toe end of that shoe and the lower end of that shoe as the heel end, and the lower end of the left hand shoe will function as the toe end and the upper end, thereof, as the heel or anchor end.

Figure 5:
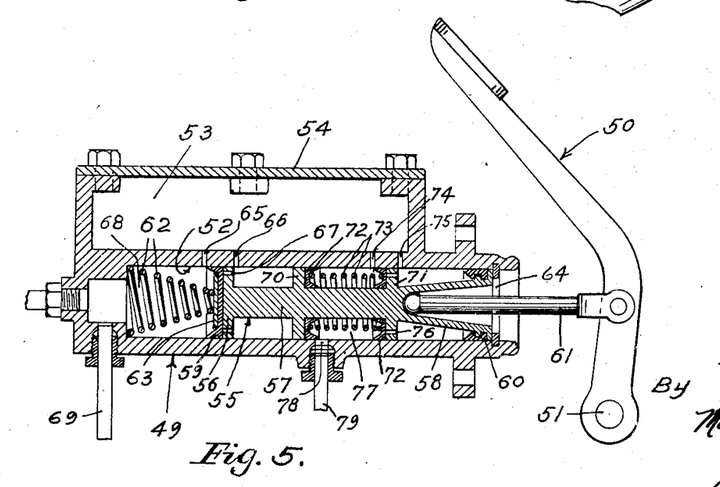
Fig. 5 is an axial sectional view, with some points on the line of section shown in full, of a master cylinder and pedal equipped operating lever.

Referring now particularly to Fig. 5, a novel master cylinder and reservoir combination is indicated as an entirety by numeral 49, and a pedal equipped operating lever is indicated by 50. The pedal equipped lever 50 may be assumed to be a conventional foot operated brake lever of a vehicle, such as a bus, truck, automobile or the like, and is pivotally anchored at 51. The master cylinder proper, indicated by 52, is afforded by a long bore in a casting which also forms the fluid reservoir, indicated by 53. The fluid reservoir 53 is located above the master cylinder which in turn, in accordance with conventional practice, will be located at the highest point in the system and said reservoir is provided with a removable cover plate 54. Working within the master cylinder 52 is a master piston 55. The master piston 55, in so far as its function as a master cylinder is concerned, consists of a head 56 and a reduced rearward extending body portion 57 terminating in a flared skirt 58 that slidably works in the bore of the master cylinder at its rearward extremity. The head 56 of the master cylinder is equipped with a forwardly opening resilient sealing cup 59, and the skirt end of the master piston is provided with a suitable resilient fluid sealing ring 60.

It may here be stated that the parts of the portion of the master cylinder pistons now described are substantially conventional in character, except that the intermediate reduced body portion 57 thereof has been made longer than in conventional practice to provide space for a master piston operated valve mechanism hereinafter to be described and which is positioned between the head and skirt ends of the master piston. In accordance with conventional practice the pedal equipped operating lever 50 is operatively connected with the master piston through the medium of a connecting rod 61. Also, in accordance with the conventional practice the master cylinder is normally held in a retired inoperative position by means of a compression spring 62 that is interposed between one end of the master cylinder and a disc 63 that presses against sealing cup 59 and retains the said sealing cup in position against the head of the master piston. Retracting movements of the master piston are limited by means of a snap ring 64, that is applied to the end of the master cylinder in the conventional manner. In still further accordance with the conventional practice, the master cylinder is provided with suitable reservoir communicated ports 65 located just ahead of the retired position of the master piston sealing cup 59 and similar reservoir communicating ports 66 that are located just rearward of the head 56 of the master piston. Further, in accordance with conventional practice, the head 56 of the master cylinder is provided near its periphery with axially extended ports 67 which coupled with the resilient action of the sealing cup 59 serve to permit passage of fluid past the sealing cup equipped head of the master piston in a forward direction whenever the pressure behind said head exceeds the pressure ahead thereof, it being understood, however that the sealing cup 59 prevents a reverse of this direction of movement of fluid past the head of the piston. That portion of the master cylinder ahead of the master piston may hereinafter be referred to as high pressure chamber of the master cylinder and is indicated by 68. Communication to this high pressure chamber 68 may be obtained through a conduit 69.

The master piston operated valve mechanism above referred to includes axially spaced radial flanges 70 and 71 formed on the intermediate portions of the reduced diameter body 57 of a master piston. These valve flanges 70 and 71 are equipped with opposed resilient annular sealing cups 72 that are retained against their respective flanges 70 and 71 by a compression spring 73. The wall of the master cylinder is provided just ahead of the retired position of the sealing cup of valve flange 71 with a reservoir communicating port or ports 74 and said wall of the master cylinder is provided just rearward of the retired position of valve flanges 71 with a similar reservoir communicating port or ports 75. For the same purpose as recited in connection with the ports 67 in the head of the master cylinder, the valve flange 71 is provided near its periphery with axially extending ports 76. The space 77 in the master cylinder between the cup equipped valve flanges 70 and 71 serves during the brake application cycle as a pressure retaining chamber and communication thereto may be had through ports 78 and connecting conduits 79.

If one or more brake mechanisms of the type described in connection with Figs. 1 to 4, inclusive, are to be operated from the master unit of Fig. 5 so that they will function as already described, it is merely necessary to connect the conduits 69 to the primary cylinder or cylinders of a brake or brakes and the master unit conduit 79 to the fluid compression chamber of the secondary cylinder or cylinders of the brake or brakes. When this is done the pressure chamber of the primary cylinder of the brake or cylinders of like connected brakes will be subject to brake applying, fluid pressure, upon depression of the pedal equipped lever 50, from the high pressure chamber 68 of the master cylinder 52 exactly in accordance with conventional practice. Obviously, when the head of the master cylinder is retired, the fluid reservoir 53 will be in operative communication with the pressure chamber of the primary cylinder 19, and will keep the same and the entire conduit system including the primary cylinder of the brake or cylinders of the brakes filled with fluid. Under advancement of the master cylinder the sealing cup equipped head thereof will pass over and close the reservoir communicating ports 65 so the continued advancement thereof will cause actuating pressure to be built up in the chamber of the primary cylinder 19. Also, when the master piston is in its retired inoperative position, the compression chamber 34 of the large diameter secondary cylinder 29 will be in open communication with the reservoir 53, so that said reservoir and the entire fluid conduit system therebetween the reservoir will be maintained full of fluid. However, under advancement of the master cylinder and its sealing cup equipped valve flanges 70 and 71, the said sealing cup equipped valve flange 71 will pass over and close off communication with the reservoir 53 through the port 74 so as to form a fluid trap between the valve flanges 70 and 71 and thereby prevent displacement of fluid from the compression chamber of the secondary cylinder.

It will be evident that with one or more brakes or plurality of brake mechanisms shown in Figs. 1 to 4, inclusive, thusly connected to the master unit 49, the brake or plurality of like connected brakes will, under the depression of the foot pedal equipped lever 50, operate in exactly the manner previously described but with the brake or brakes connected to the novel master unit as last described, the fluid compression chamber 34 of the secondary cylinder 29 will always automatically be maintained full of fluid in the release position.

Figure 6:
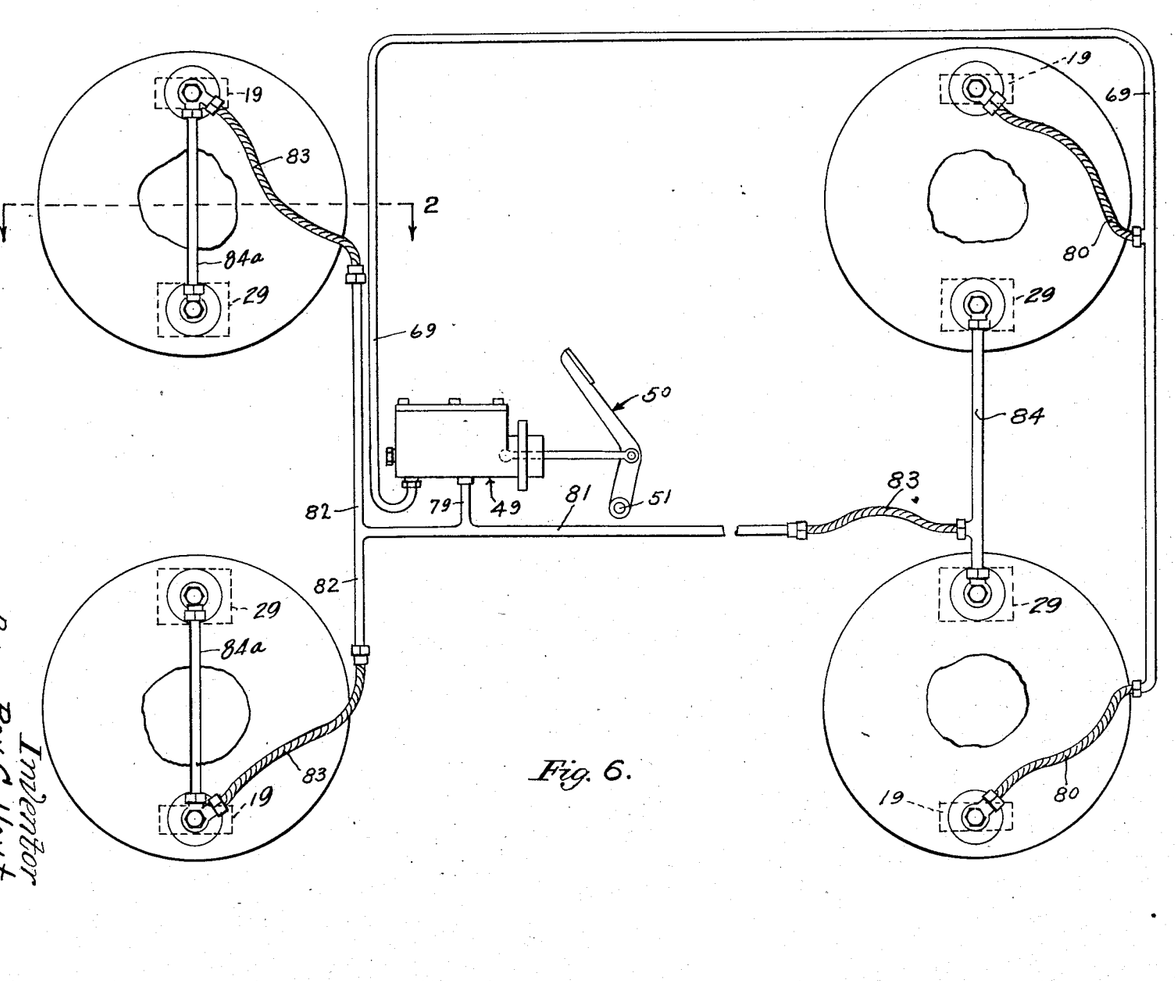
Fig. 6 is a diagrammatic view illustrating the hydraulic hook-up of four brake mechanisms of the type illustrated in Figs. 1 to 4, inclusive, and the master cylinder of Fig. 5.

In Fig. 6, a novel hook-up of four brake mechanisms of the type described in Figs. 1 to 4, inclusive, to a master unit 49 like the one illustrated in detail in Fig. 5 is diagrammatically indicated. In Fig. 6 the two brake mechanisms at the right may be considered as the two rear wheel brakes of the vehicle, and the two brake mechanisms at the left may be considered the front wheel brake mechanisms of the vehicle. In this preferred hook-up of a plurality of brake mechanisms of the form already described, the pressure chamber 23 of the primary cylinder 19 of each of the two right hand or rear wheel brakes are connected to the high pressure chamber 68 of the master cylinder 52 through the medium of the conduit 69 and branch flexible conduits 80. The compression chamber 34 of the large diameter secondary cylinder 29 of the several brake mechanisms are all connected together and to the pressure retaining chamber 77 of the master cylinder through a conduit system consisting of the conduit 79, branch conduits 81 and 82, flexible conduit sections 83, a conduit 84, and conduits 84a connecting the pressure chamber 23 of the primary cylinder of each of the secondary or front wheel brakes to the pressure chambers 34 of the secondary cylinder 29 of that brake.

*Operation of multiple brake hook-up of Fig. 6*

To apply the several brakes of Fig. 6, the operator will exert pressure on the upper end of the pedal equipped lever 50 thereby advancing the master piston 55 of the master unit and building up a pressure within the high pressure chamber 68, of the master cylinder. Under this increased fluid pressure, the fluid column extending from the high pressure chamber of the master cylinder will move outwardly into and build up corresponding pressures in the pressure chambers 23 of the primary cylinder 19 of the two rear wheel brakes, illustrated at the right in Fig. 6, thus causing projection of the primary pistons 21 of said mechanism and the connected ends of their respective cooperating friction shoes 17. As a result of this primary action, the two shoes 17 of each of the rear wheel brakes, which brakes, in this hook-up may be considered as the primary brakes, will become set into frictional brake engagement with the drum in exactly the same manner as was previously described in connection with one of said brakes, attention being called however to the following facts: that energization of the secondary shoe of each of the rear wheel brakes is energized as a direct result of fluid pressure built up in the fluid compression chamber of its cooperating secondary cylinder 29, by the imposed anchor load of the primary shoe of that brake thereon through the medium of an interposed fluid concentric pair of pistons 31 and 37. The pressure thusly built up in the compression chambers of the secondary pistons 29 of the rear wheel or primary brakes is in this instance not only employed as a source of actuating energy for the secondary shoes of the rear wheel or primary brakes, but is passed on through the conduits 84, 83, 82 and 84a to the pressure chambers of the primary cylinder 19 of the two front wheel or secondary brakes wherein an equal pressure is built up and utilized as a source of energy for projecting the pistons 21 of the front wheel or secondary brakes. Obviously, the full unit pressure built up in the compression chamber of the secondary cylinder of the primary set of brakes will be passed on to the pressure chambers of the primary cylinder 19 of the secondary or front wheel set of brakes but it is here important to note that there will be a pressure reduction between the energy applied to the fluid in the compression chambers of the secondary cylinder of the primary brakes and the pressure applied to the pistons 21 of the primary cylinders of the front wheel or secondary brakes in direct proportion to the difference in cross sectional diameters of the primary and secondary cylinders. From the above, it will be seen that the primary brake energizing pressure produced in the high pressure chamber of the master cylinder, as a result of force applied to the master piston through the medium of the pedal 50, is utilized only as means for energizing the primary shoes of the primary set of brakes and that the secondary shoes of the primary brakes and the primary shoes of the secondary brakes are energized by energy frictionally applied to the primary shoes of the primary brakes and transferred therefrom to the fluid in the compression chamber of the secondary cylinders of the primary brakes. It will further be seen that the secondary shoes of the secondary set of brakes are energized as a direct result of pressure built up in the compression chambers of the secondary cylinders of the secondary brakes under the imposed anchor load of the primary shoes of the secondary brakes. Of course, by proper proportioning of the relative diameters of the primary and secondary cylinders and pistons of the several brakes, the energizing pressure exerted on the several shoes of the several brakes can be made approximately alike. In other words, any desired percentage of the anchor load imposed upon the fluid in the compression chambers of the secondary cylinders of the primary brakes can be transferred to other affected shoes. Not only are the above noted relative diameters important from the standpoint of proper balancing of energizing pressures to the several shoes of the several brakes, but such proportioning is also important in that it may be used to greatly reduce the amount of fluid moved in the system.

Figures 7, 9, 10, 11:
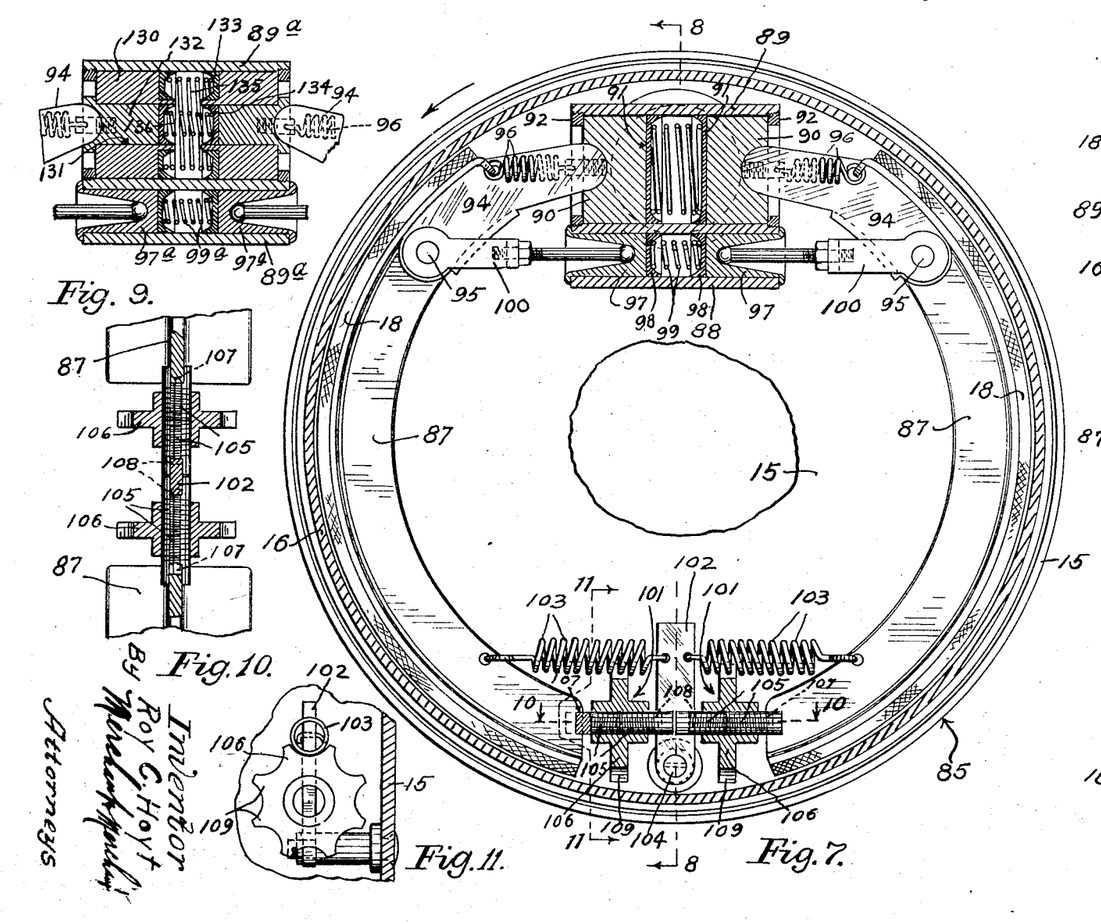
Fig. 7 is a sectional view similar to Fig. 3 but illustrating another form of the invention.
Fig. 9 is a fragmentary sectional view showing a modified cylinder piston construction that is adapted for use in connection with the brake structure of Figs. 7 and 8 and incorporates certain features common to Figs. 1 to 4, inclusive.
Fig. 10 is a fragmentary detailed sectional view taken on line 10—10 of Fig. 7.
Fig. 11 is a fragmentary detailed sectional view taken on line 11—11 of Fig. 7.
Figure 8:
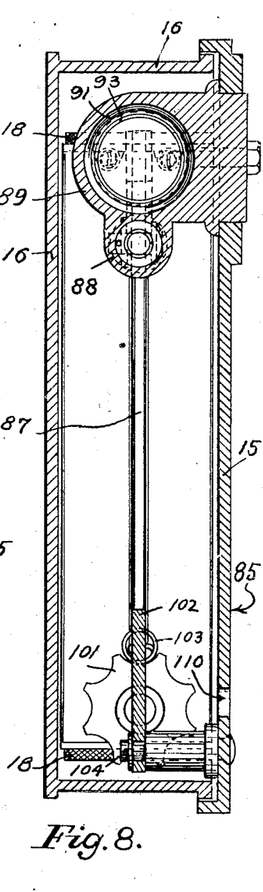
Fig. 8 is a sectional view taken on the line 8—8 of Fig. 7.
Figure 12:
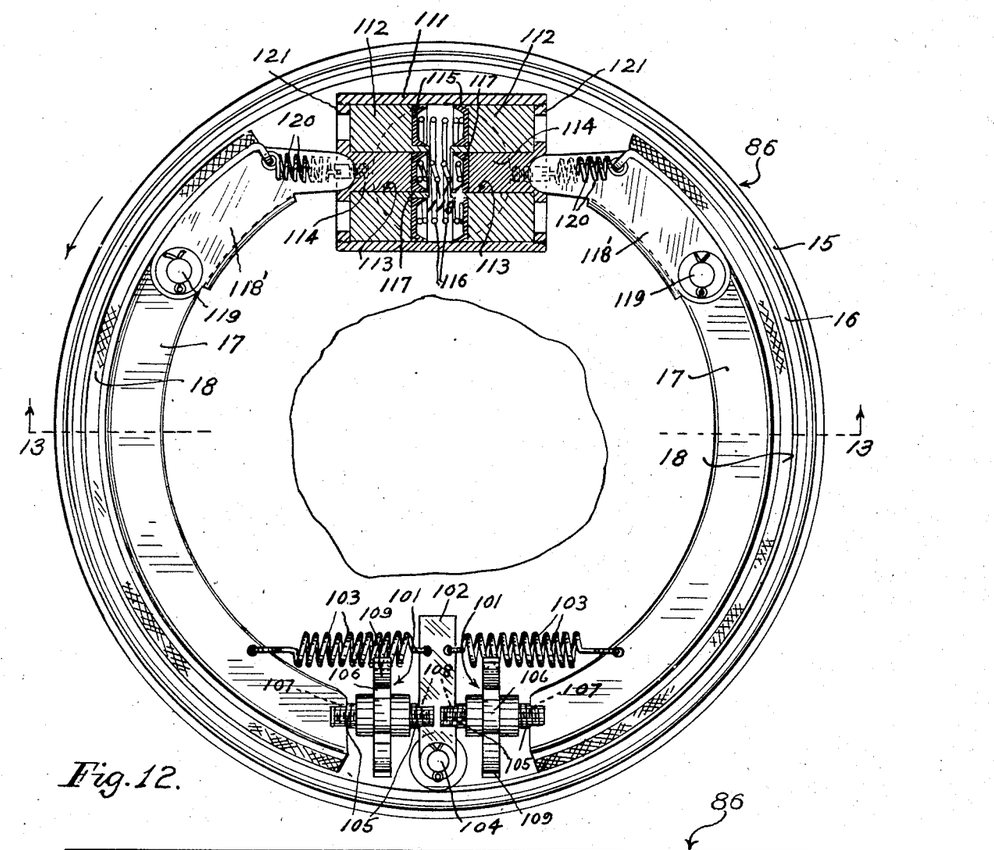
Fig. 12 is a sectional view similar to Fig. 7 but illustrating a still different form of the invention.
Figure 13:
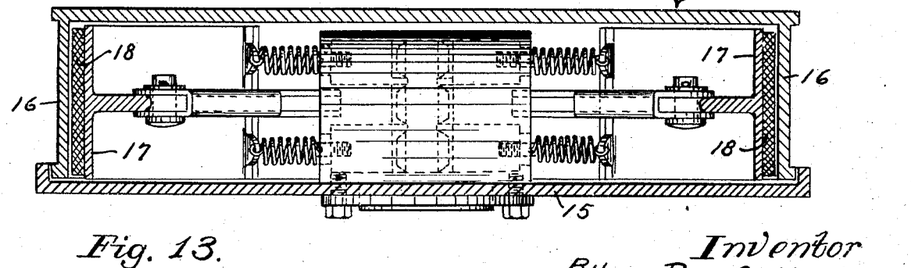
Fig. 13 is a sectional view taken on the line 13—13 of Fig. 12.
Figure 14:
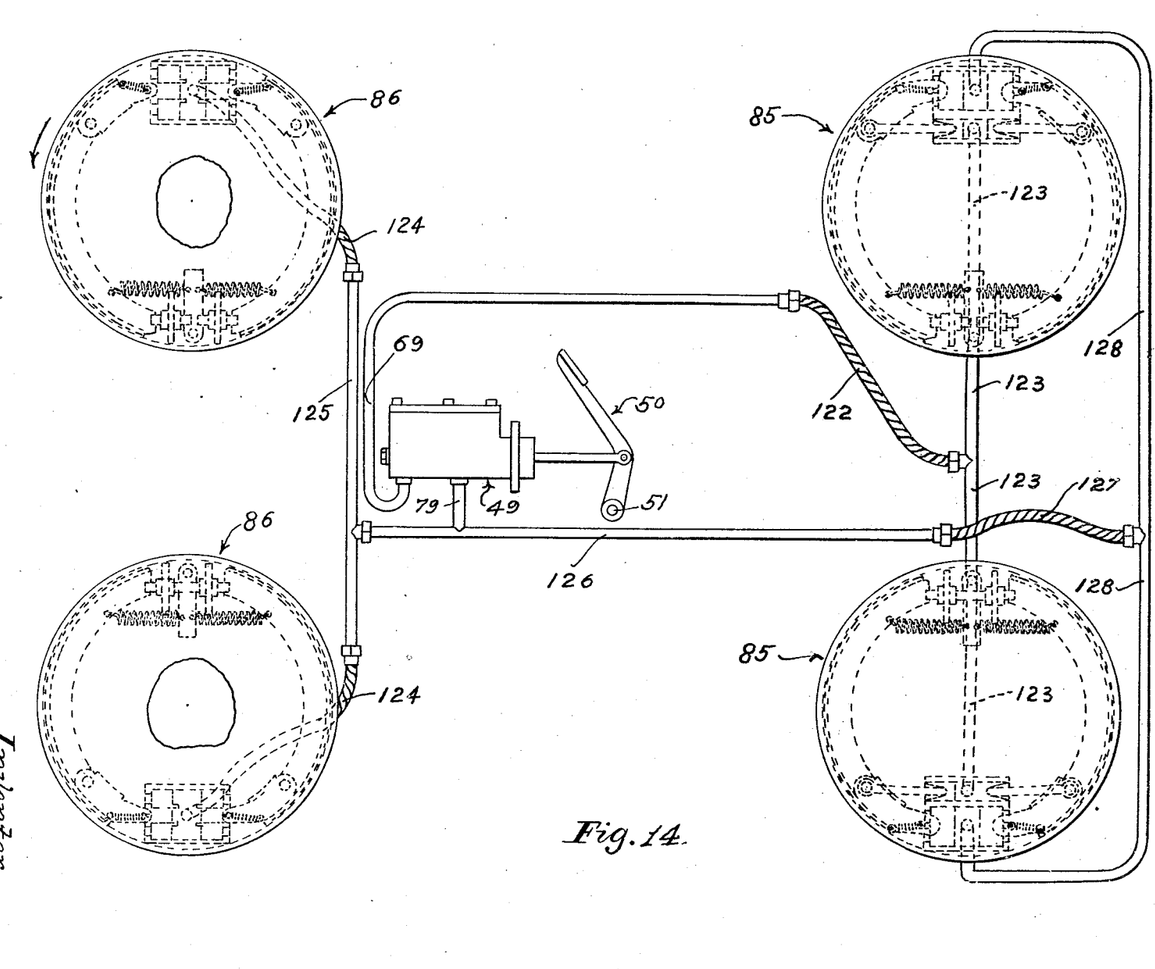
Fig. 14 is a diagrammatic view similar to Fig. 6 but illustrating the hydraulic hook-up of the master cylinder and four brake mechanisms, two of which mechanisms are of the type illustrated in Figs. 7 and 8, and two of which are of the type illustrated in Figs. 12 and 13.

The brake mechanism of Figs. 7–8–10 and 11 and that of Figs. 12 and 13 are particularly adapted to be employed in a common system wherein the former operates as the primary brake or set of brakes and the latter as a secondary brake or set of brakes, and the hook-up of such a system is illustrated in Fig. 14. The brake mechanism of Figs. 7 and 8 is indicated as an entirety by the numeral 85 and the brake mechanism of Figs. 12 and 13 is indicated as an entirety by 86.

The brake mechanism of Figs. 7-8-10 and 11 includes in addition to a backing or mounting plate 15 and a rotary brake drum 16, an opposed pair of segmental friction shoes 87 having the customary friction facing 18, a primary cylinder 88 and secondary cylinder 89. The secondary cylinder 89 is disposed between the adjacent upper ends of the shoes 87 and may be assumed to be anchored to the mounting plate 15 in the same manner as shown in connection with the secondary cylinder 29 of Figs. 3 and 4. Working within the relatively large diameter secondary cylinder 89 is an opposed pair of pistons 90 each of which is provided with an inward opening resilient sealing cup 91. The sealing cups 91 are held firmly against their respective pistons 90 and said pistons are normally resiliently held against screw threaded stop rings 92 by a compression spring 93. The upper ends of the friction shoes 87 are provided with articulating links 94 that are like those of Figs. 3 and 4 and are pivotally anchored to the shoes 87 through the medium of pins or the like 95. The inner inwardly projecting ends of the articulating links 94 engage in suitable mill slots in the outer end portions of piston 90. In this instance, the upper ends of the shoes are subject to retracting force exerted by pairs of springs 96, one end of each pair of which springs, are anchored at one end to a shoe 87 and the other end to a piston 90.

The primary cylinder 88 is formed with the secondary cylinder 89 and is equipped with an opposed pair of primary pistons 97. These pistons 97 are equipped with inwardly opening resilient sealing cups 98 that are held against ends of their respective pistons by a light coil compression spring 99. Each of the pistons 97 is connected to the upper end portions of a shoe 87 through the medium of a link 100 and a pivot pin 95.

For connecting the lower ends of the shoes 87 together and maintaining desired adjusted positions thereof during the release periods, there is provided a novel mechanism immediately to be described. This adjusting and shoe connecting mechanism includes two turnbuckle units 101, a pendulum like finger 102 and a pair of tension springs 103. The pendulum acting finger 102 is pivotally anchored to the mounting plate 15 at 104. The springs 103 are each anchored at one end to the lower end portions of a shoe 87 and at their other or inner ends to the adjacent upper portion of pendulum 102. Springs 103 are, as will be seen, disposed in axially alined relation and tied together at their inner ends through the medium of the pendulum 102. The turnbuckle units 101, located on opposite sides of pendulum 102, are axially alined and are connected through the medium of the intermediate portion of the pendulum 102. Each of the turnbuckle units 101 comprises an opposed oppositely screw threaded pair of screws 105 and a cooperating internally threaded adjustment wheel 106. The adjustment wheels 106 are screw threaded one-half way through to match the threads of the inner screws 105 and are oppositely screw threaded through their other end portions to receive the outer screws 105. The projecting ends of the outer turnbuckle screws are bifurcated to work over the radial flanges of shoes 87 and the ends of said radial flanges are notched out at 107 for interlocking engagement with said screws (see Figs. 7 and 10). Inwardly projecting ends of the inner screws 105 are bifurcated to work over the intermediate portion of the pendulum 102 and said pendulum is notched for interlocking engagement with said screws, as shown at 108 in Fig. 7. The peripheral portions of the adjustment wheel 106 are notched to provide circumferentially spaced teeth 109 adjacent of which are adapted to embrace intermediate portions of an adjacent spring 103 to prevent accidental rotation of the adjustment wheels. For purpose of adjustably rotating the adjustment wheel 106, the backing plate 15 (see Fig. 8) is provided with an aperture 110 for insertion of a screw driver or similar tool. Under rotating pressure exerted by such a tool the springs 103 yield to permit forced rotation of the adjustment wheel, but when adjusting pressure is released the said springs fall into a notch between two adjacent teeth on the wheels and thereafter prevent accidental rotation.

The turnbuckle units 101, each being spaced or bridged by an individual one of the springs 103, are each adjustably effective only on the one shoe. For example, under rotation of either of the adjustment wheels 106, the bridging spring 103 thereof will yield in the direction of adjustment and permit any desired clearance to be obtained between the lower end of the directly connected shoe 87 and the drum without in any way effecting the adjusted position of the other shoe. However, under braking action the opposite turnbuckle units 101 and pendulum 102 serve as a common linkage for transmitting the anchor load of one shoe to the other shoe and in this capacity each of the turnbuckle units 101 serve as an articulating link and permit radial outward movement of their associated ends of the shoes into full engagement with the drum.

The form of brake mechanism illustrated in Figs. 12 and 13 includes the customary backing plate 15, rotary brake drum 16, and a pair of circumferentially spaced segmental friction shoes 17 which latter, are provided with the customary facings or linings 18. The lower ends of opposite shoes are, in this form of invention, connected together and maintained, during the inoperative cycles, in adjusted retired position through the medium of mechanisms described in connection with Figs. 7-8-10 and 11 and indicated in Figs. 12 and 13 by characters assigned to the like parts in Figs. 7-8-10 and 11. Mounted within the brake drum between adjacent upper ends of the shoes 17 and securely anchored to the backing plate 15, is a large diameter cylinder 111 that is substantially a duplicate of the secondary cylinder 29 of Figs. 3 and 4 and does in fact, contain mechanisms substantially identical to that shown in Figs. 3 and 4. This cylinder 111 also has a diameter, as illustrated, equal to that of the secondary cylinder 89 of Figs. 7 and 8. The large diameter pistons of cylinders 111, indicated by 112, are axially bored to provide therein small diameter cylinders 113 each of which is fitted with a headed piston 114. The large diameter pistons 112 are provided with inwardly opening annular sealing rings 115 that are held against their respective pistons by a coil compression spring 116. The small diameter piston-carried pistons 113 are provided at their inner ends, within the small diameter cylinder bores, 113, with resilient sealing cups 117 that are normally held in place by an interposed compression spring 118. The upper ends of the shoes 17 are operatively connected to the adjacent small diameter pistons 114 through the medium of articulating links 118', the outer ends of which links, are pivotally anchored to the shoes by pins or the like 119, and the inner ends of which engage in suitable mill slots in the head ends of the small diameter pistons 114. The upper ends of the shoes 17 are normally held in their retired inoperative position each by a pair of springs 120 the outer ends of which springs are anchored to the shoes and the inner of which are anchored to the large diameter pistons 112 in the manner previously described in connection with other figures. The large diameter piston engaging stop rings of the cylinder 111 are indicated by numeral 121.

In Fig. 14 the hook-up between two brake mechanisms 85 of the type shown in Figs. 7-8-10 and 11 together with two brake mechanisms 86 of the type shown in Figs. 12 and 13, and a master unit 49 of the type shown in Fig. 5 is as follows: The high pressure chamber 68 of the master cylinder is connected through conduit 69, a flexible conduit 122, and branch conduits 123 to the pressure chamber of the primary cylinder 88 of each of the primary brake mechanisms 85 of Fig. 14. The pressure chamber of cylinder 111 of the two secondary brake mechanisms of Fig. 14 are connected together and to the pressure chambers of the secondary cylinder 89 of the two primary brake mechanisms 85 by a conduit system comprising flexible conduits 124 extending one from the pressure chamber of each of the secondary brake mechanisms 86, a conduit 125 connecting the said conduit 124, a conduit 126, a flexible conduit 127 and branch conduits 128. This last described conduit system is connected to the pressure retaining chamber 77 of the master cylinder through the previously described conduit 79.

*Operation of brake-hook-up of Fig. 14*

When the operator depresses the pedal equipped end of the operating lever 50 to set the several brakes, the master piston 57 will be advanced thereby building up a pressure in the master cylinder and advancing fluid therethrough, and through the conduit 69, 122 and 123 into the pressure chambers of the primary cylinder 88 of the two primary brake mechanisms 85. This advancement of fluid will, of course, build up pressure in the pressure chamber of the primary cylinders 88 and cause simultaneous projection of the primary pistons 97, which will, in turn, through the medium of the links 100, move the upper end of the two shoes 87 of the primary brake mechanisms 85 into initial frictional engagement with the cooperating brake drum 16. For the purpose of this description, it may be assumed that the vehicle in which the several brake mechanisms 85 and 86 are incorporated is moved in a forward direction and that the several brake drums are rotating in a counter clockwise direction, as indicated in Figs. 7 and 12. Under this direction of rotation the left hand friction shoes 17 and 87 respectively of Figs. 7 and 12 respectively will serve as the primary brake shoes and the right hand shoes of said brakes will serve as the secondary shoes; and the upper ends of the left hand or primary friction shoes 87 and 17 respectively of Figs. 7 and 12 will function as the toe ends of those shoes, the lower ends of the right hand or secondary shoes 87 and 17 will serve as the toe ends of those shoes, and the lower ends of the left hand or primary shoes 87 and 17 and the upper ends of the right hand or secondary shoes 87 and 17 will function as the heel ends thereof. Energy frictionally picked up by the left hand or primary shoes of the primary brake mechanism 85 will tend to rotate said primary shoes in a counter clockwise direction, and this anchor load will be transferred, in its entirety, from the heel ends of the primary shoes to the lower or toe ends of the right hand or secondary shoes 87. This will cause the toe ends of the secondary shoes 87 to move into frictional engagement with the brake drum so that the entire frictional load from both shoes will now be transferred through the right hand articulating links 94 to the fluid in the pressure chambers of the secondary cylinders 89, through the right hand large diameter piston 90. As previously indicated, the turnbuckle adjusting units 101 are pivotally movable in the manner of the articulating links and will therefore, permit radial outward movement of their respective ends of the shoes 87 into complete frictional engagement with the brake drum, under brake action as described above, and of course, the articulating links 94 insure such complete engagement of their respective ends of the brake shoe 87 with the drum. The entire anchor load of both shoes 87 of each of the brake mechanisms 85, being now imposed upon the fluid in the chambers of the secondary cylinders 89 of each of said brake mechanisms, fluid will be expelled from the said chambers of the secondary cylinders 89 through the conduits 128, 127, 126, 125 and 124 to the chambers of the cylinders 111 of the secondary brakes 86. This movement of fluid into the chambers of the cylinders 111 of the secondary brakes 86, will build up a fluid pressure within the said chambers equalling that in the chambers of the secondary cylinders 89 of the primary brakes, which will cause projection of the smaller diameter piston-carried-pistons 114 of the primary brakes, and outward movement of the upper ends of the shoes 17 of the primary brakes into frictional engagement with the brake drums thereof. Under frictional load picked up by the primary or left hand shoes 17 of the primary brakes from the counter clockwise rotating drums 15, said primary shoes 17 will tend to rotate in counter clockwise direction and will transfer the anchor loads to the right hand or secondary shoes 17 of the secondary brake mechanisms 86, through the medium of the turnbuckle units 101 and interposed pendulum 102. As in the case of the primary brake mechanisms, the turnbuckle units 101 will permit radial outward movement of their respective ends of the shoes 17 into complete engagement with the brake drums. The secondary shoes of the secondary brake mechanisms 86 being now both set in frictional engagement with the drum, the anchor load of both shoes 17 of each of said secondary brake mechanisms will be primarily transferred to the piston-carried-pistons 114 of the secondary brake mechanisms 86 which will cause retraction of the right hand piston-carried-pistons after which the entire anchor load of both shoes will be transferred to the fluid in the chambers of the cylinders 111 through the medium of right hand concentric pistons 112, and 114, thereby further building up the pressures in the last noted chambers. This now greatly increased pressure in the cylinder 111 of the secondary brakes will react on the left hand piston-carried pistons 114 of the secondary brake mechanisms 86 and will react as further energizing force on the upper or toe ends of the shoes 17.

From the above, it will be seen that in the brake hook-up of Fig. 14, the full anchor load of both shoes 87 of the primary brake mechanisms 85 is transferred, first to the fluid in the chambers of the secondary cylinders 89 of the primary brakes, and then is transferred in its entirety to the chambers of the cylinders 111 of the secondary brake mechanisms 86 where, by virtue of the reduction in cross sectional area between the cylinders 111 and that of the left hand piston-carried-pistons 114, a desired part of the anchor load from the shoes of the primary brake mechanisms is carried, and a desired reduced part thereof is transferred to the upper or toe ends of the left hand primary brake shoes 17 of the secondary brakes, through the left hand piston-carried-pistons 114. This reduced portion anchor load of the several shoes 87 of the primary brakes is utilized as an energizing force for initially setting the secondary brake mechanisms and when the shoes 17 of the secondary brake are thusly brought into frictional engagement with their drums, the energy frictionally picked up by the primary and secondary shoes 17 of the secondary brakes will also be imposed upon the fluid in the chamber of cylinders 111 of the secondary brakes and again a part of this increased pressure will be transferred through the left hand piston-carried-pistons 114 to the primary shoes 17 of the secondary brakes, and utilized to further increase the frictional engagement between the primary and secondary shoes 17 of the secondary brakes. In this arrangement, the final anchor load of the several shoes of the several brakes is carried by the left hand piston-carried-pistons 114 of Fig. 12, by virtue of the interlocking engagement of the articulating links 118' in the milled slots in the heads of the left hand piston-carried-pistons 114, which, latter, are disposed at an obtuse angle with respect to the line of movement of the brake drums.

The above described multiple brake hook-up of Fig. 14 is considered particularly desirable in heavy vehicles such as trucks and busses, where very heavy load force must be stopped as a result of relatively low applied force and relatively small movement at the control point which, in this case, is the pedal equipped lever 50.

By substituting for the primary and secondary cylinders 88 and 89 and their respective cup equipped pistons the piston cylinder unit of Fig. 9, still another highly desired form of the invention is provided. In Fig. 9, the primary and secondary cylinders being like those of Fig. 7 are indicated by like characters plus the exponent (a), and the primary pistons and other parts within the primary cylinders 89a being the same as those of Fig. 7 are indicated by like characters plus the exponent (a). The large diameter pistons of Fig. 7, indicated by 130, are axially bored to provide relatively small diameter cylinders 131 within which are mounted small diameter pistons 132. The large diameter pistons 130 are provided with inwardly opening sealing rings 133 and the smaller diameter pistons 132 are provided with resilient sealing cups 134. The sealing rings and cups of Fig. 9 are respectively held in position by compression springs 135 and 136. When the piston cylinder structure of Fig. 9 is used in place of that of Fig. 7, the brake structure will function much as described in connection with Fig. 7 except that a desired part of the cumulative anchor load of the primary and secondary shoes will be transferred to the toe or primary actuating end of the primary shoe through the medium of the fluid in the chamber of the cylinder 89a and a small diameter piston 132, thereby further materially increasing the effectiveness of the brake with relation to the pressure applied to the chamber of the primary cylinder 97a. In this case, as in Fig. 13 the cumulative anchor load of the shoes will be borne partly by the fluid within the chamber of the cylinder 89a and in part by the piston-carried-piston 132 associated with the primary shoe.

The coil compression springs 116, 93, and 36 interposed between the cup equipped heads of the several large diameter pistons in the several large diameter cylinders are preferably strong enough to insure return of effected pistons to normal retired positions.

This application is filed in place of and as a duplicate of applicant's previously filed application S. N. 163,427, filed September 11, 1937, on "Vehicle brake," some different claims being submitted but no change made in the disclosure, said previously filed application has become abandoned since the filing of this application.

From the above description it will be seen that I have provided a simple and highly efficient brake system for a vehicle or vehicles. The device will have a high degree of utility for the purpose intended.

It will, of course, be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A vehicle braking device having in combination, a set of brakes for certain wheels of a vehicle, a brake for each wheel comprising a drum and a plurality of brake shoes for engaging the same and arranged for some movement substantially circumferentially of said drum when brought into frictional engagement therewith, a chamber containing fluid, plungers acting on said fluid and movable by said fluid connected respectively to said shoes, a master cylinder containing fluid, a piston movable in said cylinder exerting pressure on said fluid in said chambers to move said shoes into frictional engagement with said drums, a second chamber for each of said drums, the same containing fluid, means movable by said shoes respectively for exerting pressure on said fluid in said last mentioned chamber, a second set of brakes for other vehicle wheels, the brake for each of said latter wheels including a drum and shoes movable into engagement therewith, a fluid containing chamber and means movable by said fluid for moving said last mentioned shoes, means connecting said last mentioned chambers together and to a chamber in said master cylinder and to said second chambers.

2. A vehicle braking device having in combination, a set of brakes for certain wheels of a vehicle, a brake for each wheel comprising a drum and a plurality of brake shoes for engaging the same and arranged for some movement substantially circumferentially of said drum when brought into frictional engagement therewith, a chamber containing fluid, plungers acting on said fluid and movable by said fluid connected respectively to said shoes, a master cylinder containing fluid, a piston movable in said cylinder forming a pressure chamber therein, means connecting said pressure chamber to said chambers to exert pressure on the fluid therein and move said shoes, a second chamber for each drum containing fluid, means in said second chamber movable by said shoes for exerting pressure on the fluid therein, a second set of brakes for other vehicle wheels, the brake for each wheel comprising a drum, shoes movable into engagement therewith, a chamber containing fluid and means movable by pressure on said fluid for moving said shoes into engagement with their drum, a second chamber in said master cylinder closed when said piston is advanced to produce pressure in said pressure chamber, means connecting said last mentioned chambers together, to said second chamber in said master cylinder and to said second mentioned chambers whereby said second set of brakes is operated by pressure in said second mentioned chambers.

3. The structure set forth in claim 2, a reserve chamber for fluid connected to said master cylinder, said reserve chamber being connected to said pressure chamber and to said second chamber in said master cylinder when the brakes are released and said piston in the master cylinder is in retracted or inoperating position.

4. A vehicle braking device having in combination, a set of brakes for certain wheels of said vehicle, the brake for each wheel comprising a drum, a plurality of brake shoes for engaging the same and arranged for some movement substantially circumferentially of said drum when brought into frictional engagement therewith, a chamber containing fluid, plungers acting on and movable by said fluid connected respectively to said shoes, means for exerting pressure on said fluid to move said shoes, a second chamber for each drum, the same containing fluid, means moved by said shoes when brought into engagement with said drum for exerting pressure on the fluid in said last mentioned chambers, a second set of brakes for other vehicle wheels, the brake for each wheel comprising a drum, shoes movable into engagement therewith, a fluid containing chamber and means movable by said fluid when under pressure for moving said shoes, means for connecting said last mentioned chambers together and also connected to said second mentioned chambers whereby said pressure is equalized in said last mentioned chambers and said second set of brakes is operated by the pressure of fluid in one of said second mentioned chambers.

5. A vehicle brake system having in combination, a set of brakes for certain wheels of said vehicle, the brake at each wheel comprising a drum and a plurality of shoes movable into frictional engagement therewith, said shoes having some movement substantially circumferentially of said drum, a fluid operated means for moving said shoes toward their drums, a cylinder in each of said drums containing fluid, plungers in said cylinder and arranged to take the anchor stress of said shoes and place pressure on the fluid in said cylinder, a second set of brakes for other vehicle wheels each comprising a drum and shoes movable into frictional engagement therewith, said shoes having some movement substantially circumferentially of their drum, a chamber for fluid and members movable by said last mentioned fluid for moving said last mentioned shoes against their drums and a reserve reservoir of fluid with which the fluid for operating both sets of brakes is connected when the brakes are in non applied position whereby should the brake shoes be frozen to the drums the vehicle could move a short distance owing to the possible circumferential movement of said shoes to release said shoes.

6. In a friction brake mechanism the combination with a rotary brake drum and primary and secondary segmental brake shoes arranged in circumferentially spaced relation within the drum and normally spaced therefrom, a pair of cylinders, a pair of pistons for each cylinder, each pair of pistons being spaced in their respective cylinder to afford an intermediate compression chamber, means for connecting one piston of each pair thereof to the end portion of one of the said shoes, means connecting the other piston of each pair thereof to the adjacent end of the other said shoes, said last mentioned means connecting one of said latter pistons constituting a link and means for supplying fluid under pressure to one of said cylinders to move said shoes, said shoes acting to apply pressure to the fluid in the other cylinders.

7. In a friction brake mechanism the combination with a rotary brake drum and primary and secondary segmental brake shoes arranged in circumferentially spaced relation within the brake drum and normally spaced therefrom, of a hydraulic cylinder disposed between two adjacent ends of the primary and secondary brake shoes, pistons working in opposite end portions of said cylinder and operatively engaging opposite end portions of opposite of said brake shoes, a relatively large diameter cylinder located between the other adjacent ends of the primary and secondary shoes, a pair of opposed relatively large diameter pistons working in opposite end portions of said cylinder in spaced relation to afford a compression chamber, stop means limiting outward moving of large diameter pistons, and an opposed pair of relatively smaller diameter pistons working through the said large diameter pistons said smaller diameter pistons being subject to fluid pressure in the said compression chamber and being operatively connected to adjacent ends of opposite shoes.

8. In a friction brake mechanism the combination with a rotary brake drum and primary and secondary segmental brake shoes arranged in circumferentially spaced relation within the brake drum and normally spaced therefrom, of a relatively large diameter cylinder located between two adjacent ends of the primary and secondary shoes, a pair of opposed relatively large diameter pistons working in opposite end portions of said cylinder in spaced relation to afford an intermediate compression chamber, stop means limiting outward movement of the large diameter pistons, an opposed pair of relatively small diameter pistons working axially through the said large diameter pistons, said small diameter pistons being subject to fluid pressure in the said compression chamber and being operatively connected to adjacent ends of opposite shoes, and means for exerting expanding pressure between the other opposed ends of the primary and secondary brake shoes.

9. In a friction brake mechanism the combination with a rotary brake drum and primary and secondary segmental brake shoes arranged in circumferentially spaced relation within the brake drum and normally spaced therefrom, of a relatively large diameter cylinder located between two adjacent ends of the primary and secondary friction shoes, a pair of opposed relatively large diameter pistons working in opposite end portions of said cylinder in spaced relation to afford an intermediate compression chamber, stop means limiting outward movement of the large diameter pistons, an opposed pair of relatively small diameter pistons working through the said large diameter pistons, said small diameter pistons being subject to fluid pressure in the said compression chamber and being operatively connected to adjacent ends of opposite shoes, and means for exerting expanding pressure between the other opposed ends of the primary and secondary brake shoes.

10. In a friction brake mechanism the combination with a rotary brake drum and primary and secondary segmental brake shoes arranged in circumferentially spaced relation within the brake drum and normally spaced therefrom, of a relatively large diameter cylinder located between two adjacent ends of the primary and secondary friction shoes, a pair of opposed relatively large diameter pistons working in opposite end portions of said cylinder in spaced relation to afford an intermediate compression chamber, an opposed pair of relatively small diameter pistons working through the said large diameter pistons, said small diameter pistons being subject to fluid pressure in the said compression chamber and being operatively connected to adjacent ends of opposite shoes, and means for exerting expanding pressure between the other opposed ends of the primary and secondary brake shoes.

11. In a friction brake mechanism the combination with a rotary brake drum and primary and secondary segmental brake shoes arranged in circumferentially spaced relation within the brake drum and normally spaced therefrom, of a relatively large diameter cylinder located between two adjacent ends of the primary and secondary friction shoes, a pair of opposed relatively large diameter pistons working in opposite end portions of said cylinder in spaced relation to afford an intermediate compression chamber, an opposed pair of relatively small diameter pistons working through the said large diameter pistons, said small diameter pistons being subject to fluid pressure in the said compression chamber and being operatively connected to adjacent ends of opposite shoes, and means for exerting expanding pressure between the other opposed ends of the primary and secondary brake shoes.

12. In a friction brake mechanism the combination with a rotary brake drum and primary and secondary segmental brake shoes arranged in circumferentially spaced relation to one another and in close spaced relation to the drum, of a cylinder, a pair of opposed relatively large diameter pistons working in opposite end portions of the cylinder in spaced relation to one another to afford an intermediate compression chamber, stop means positively limiting outward movement of the large diameter pistons, an opposed pair of relatively small diameter pistons working one through each of said large diameter pistons, said small diameter pistons also being subject to fluid pressure in the said compression chamber and being operatively connected each to an adjacent end of an opposite brake shoe by means of linkage that will bring the said ends of the brake shoes into engagement with the drum under outward movements of their respectively connected small diameter pistons, and means for forcing the other adjacent ends of the primary and secondary shoes into frictional engagement with the drum to apply the brake.

13. In a friction brake mechanism the combination with a rotary brake drum and primary and secondary segmental brake shoes arranged in circumferentially spaced relation to one another and in close spaced relation to the drum of a cylinder, a pair of opposed relatively large diameter pistons working in opposite end portions of the cylinder in spaced relation to one another to afford an intermediate compression chamber, stop means positively limiting outward movement of the large diameter pistons, an opposed pair of relatively small diameter pistons working one through each of said large diameter pistons, said small diameter pistons also being subject to fluid pressure in the said compression chamber and being operatively connected each to an adjacent end of an opposite brake shoe, and means for forcing the other adjacent ends of the primary and secondary shoes into frictional engagement with the drum to apply the brake.

14. In a friction brake mechanism the combination with a rotary brake drum and primary and secondary segmental brake shoes arranged in circumferentially spaced relation to one another and in close spaced relation to the drum, of a cylinder, a pair of opposed relatively large diameter pistons working in opposite end portions of the cylinder in spaced relation to one another to afford an intermediate compression chamber, stop means positively limiting outward movement of the large diameter pistons, an opposed pair of relatively small diameter pistons working one through each of said large diameter pistons, said small diameter pistons also being subject to fluid pressure in the said compression chamber and being operatively connected each to an adjacent end of an opposite brake shoe, and load transferring linkage operatively connecting the other adjacent ends of the primary and secondary brake shoes.

15. In combination with a vehicle having two pairs of wheels, a set of brakes for the wheels of one of said pairs, a second set of brakes for the wheels of said other pair, the brake for each wheel of said first mentioned pair comprising a drum and a plurality of brake shoes for engaging the same, said shoes being arranged for some movement substantially circumferentially of said drum when brought into frictional engagement therewith, a chamber in each of said drums containing fluid, plungers acting on said fluid and connected respectively to said shoes, a master cylinder containing fluid, a piston movable in said cylinder forming a fluid pressure chamber therein, means connecting said pressure chamber to said first mentioned chambers for exerting pressure on the fluid in said first mentioned chambers for moving said shoes, a second chamber in each of said drums containing fluid, reciprocating means acting on said fluid in each of said second chambers and connected respectively to said shoes and movable thereby, a second chamber in said master cylinder connected to said last mentioned chambers, the brakes on said wheels of said second pair also each including a drum and a plurality of brake shoes for engaging the same, said shoes being arranged for some movement substantially circumferentially of said drum when brought into frictional engagement therewith, a chamber containing fluid in each of said last mentioned drums, plungers acting on said fluid movable by said fluid and connected respectively to said last mentioned shoes, a second chamber in each of said last mentioned drums containing fluid and reciprocating means acting on said fluid in each of said last mentioned second chambers movable by said last mentioned shoes respectively for applying pressure on said fluid, means connecting said second mentioned chambers in the drums of the brakes, for said first mentioned pair of wheels to said first mentioned chambers in the drums of the brakes of said second mentioned pair of wheels, whereby movement by said shoes of said first mentioned set of brakes will exert pressure on the fluid in said first mentioned chambers of said second mentioned drums and operate said set of brakes of said second pair of wheels whereby the application pressure of said brakes will be equalized in the brake of all of said wheels and the pair of shoes exerting the greatest pressure will determine the pressure of fluid for applying both sets of brakes.

16. The structure set forth in claim 15, a reserve chamber for fluid connected to said master cylinder, a second piston in said master cylinder and ports leading from said reserve chamber to said master cylinder with which said pistons in said master cylinder cooperate.

17. In a friction brake mechanism the combination with a rotary brake drum and primary and secondary segmental brake shoes arranged in circumferentially spaced relation within the brake drum and normally spaced therefrom and having some movement substantially circumferentially of said drum, a cylinder at one side of said drum, a pair of pistons in said cylinder spaced to provide a fluid chamber therebetween, means connecting said pistons respectively to the adjacent ends of the primary and secondary brake shoes, a second cylinder in said drum, a pair of pistons in said second mentioned cylinder spaced to provide a fluid chamber therebetween, means connecting said last mentioned pistons respectively to the adjacent ends of said primary and secondary brake shoes and smaller pistons movable in each of said last mentioned pistons operatively connected to the adjacent ends of said primary and secondary brake shoes and acted upon by the fluid in said last mentioned chamber.

18. In a friction brake mechanism the combination with a rotary brake drum and primary and secondary segmental brake shoes arranged in circumferentially spaced relation to one another and in normally spaced relation to the drum, a pair of relatively large diameter pistons, cylinder means enclosing each of the large diameter pistons and in which said pistons work, relatively small diameter pistons working one through each of said large diameter pistons, stop means limiting outward movement of the large diameter pistons, stop means limiting inward movement of the small diameter pistons through the large diameter pistons, means operatively connecting the small diameter pistons each to an adjacent end of an opposite shoe, rotary load transferring linkage between the adjacent other ends of the shoes and a common body of fluid interposed between the other ends of opposite large and small diameter pistons.

19. The structure defined in claim 18 in further combination with another brake structure which includes a fluid pressure chamber and a fluid connection from the fluid body of the first noted brake to the fluid compression chamber of the second noted brake.

20. The combination with two brakes, each brake incorporating a rotary brake drum, two circumferentially spaced segmental oppositely disposed friction shoes located within the drum and normally spaced therefrom, a primary fluid pressure cylinder, pistons working in opposite ends of said primary cylinder and operatively engaging two adjacent ends of opposite shoes, said pistons of the primary cylinder being spaced to afford a fluid expansion chamber therebetween within the cylinder, stop means limiting retracting movement of the primary pistons, a secondary cylinder of greater diameter than the said primary cylinder, a pair of large diameter secondary pistons working in said secondary cylinder, stop means limiting outward movement of said large diameter pistons, small pistons working axially respectively through the said large diameter secondary pistons and being subject to fluid pressure within the said compression chamber of the secondary cylinder and each operatively engaging adjacent ends of opposite friction shoes, stop means limiting inward movement of said smaller diameter pistons with respect to the said large diameter pistons, and yielding means tending to retract the shoes out of frictional engagement with their respective drum, means for producing fluid pressure in the expansion chamber of the primary cylinder and a fluid conduit extending from the fluid compression chamber of the large diameter cylinder of one of the said brakes to the fluid expansion chamber of the other of said brakes.

21. A vehicle braking device having in combination, a set of brakes for certain wheels of said vehicle, the brake for each wheel comprising a drum and a plurality of brake shoes for engaging the same, said shoes being arranged for some movement substantially circumferentially of said drum when brought into frictional engagement therewith, a chamber containing fluid, plungers acting on said fluid, movable by said fluid and respectively connected by said shoes, means connecting said chambers, means for exerting pressure on said fluid to move said shoes in to frictional engagement with said drum, a second fluid chamber in each of said drums, a second set of brakes for other wheels, the brakes on said latter wheels each including a drum and a plurality of shoes for engaging the same and also including a primary chamber and a secondary chamber containing fluid, means movable by said fluid in said last mentioned chambers for moving said last mentioned shoes, said primary chambers being connected and means movable by said shoes of said first mentioned set of brakes for exerting pressure on the fluid in said second chambers, said second chambers being connected to said primary chambers whereby the shoe of said first mentioned set of brakes exerting the greatest pressure in said second chamber and hence on said last mentioned means will determine the pressure of fluid for operating said second set of brakes and the pressure in said last mentioned chambers will be equalized.

22. A vehicle braking device having in combination, a set of brakes for certain wheels of said vehicle, the brake for each wheel comprising a drum and a plurality of brake shoes for engaging the same, said shoes being arranged for some movement substantially circumferentially of said drum when brought into frictional engagement therewith, a chamber containing fluid, plungers acting on said fluid and movable by said fluid connected respectively to said shoes, means connecting said chambers, means for exerting pressure on said fluid to move said shoes into frictional engagement with said drum, a fluid cylinder for each of said drums, plungers in said cylinders connected respectively to said shoes so that movement of said shoes will exert pressure on the fluid in said cylinders, fluid-containing conduit connecting said fluid cylinders, a second set of brakes for other wheels, each brake comprising a drum, a plurality of shoes movable into frictional engagement therewith, a fluid chamber and means for moving said shoes by pressure on the fluid in said fluid chamber, a conduit connecting said last mentioned chambers together and connected to said last mentioned conduit whereby the pressure in said fluid cylinders and fluid chambers is equalized.

23. A vehicle braking device having in combination, a set of brakes for certain wheels of said vehicle, the brake for each wheel comprising a drum, a plurality of brake shoes for engaging the same and arranged for some movement substantially circumferentially of said drum when brought into frictional engagement therewith, a chamber containing fluid, plungers acting on and movable by said fluid connected respectively to said shoes, means for exerting pressure on said fluid to move said shoes, means for connecting said chambers of said respective wheels, a second chamber for each drum containing fluid, means movable by said shoes when brought into frictional engagement with their drums for exerting pressure on said fluid in said second chambers, a second set of brakes for other vehicle wheels, the brake for each wheel comprising a drum, shoes movable into engagement therewith, a chamber containing fluid, plungers in said chamber and connected to said last mentioned shoes, means connecting said second chambers and means connecting said last mentioned chambers and said second chambers for causing pressure in said last mentioned chambers for actuating the shoes of said second set of brakes.

24. A vehicle braking device having in combination, a set of brakes for certain wheels of a vehicle, the brake for each wheel comprising a drum and a plurality of oppositely disposed brake shoes for engaging the same, said shoes being arranged for some movement substantially circumferentially of said drum when brought into frictional engagement therewith, individual hydraulic mechanisms associated with each end of each brake shoe and cooperating with said shoes in the application of said brakes, sets of brakes for another pair of wheels, hydraulic connections from said hydraulic mechanisms to said last mentioned set of brakes, a master cylinder, means connecting said master cylinder and one of said hydraulic mechanisms for supplying pressure to apply said first mentioned set of brakes, means connecting said master cylinder to said last mentioned set of brakes, said hydraulic mechanisms acting to apply said last mentioned set of brakes automatically when said first mentioned set of brakes are applied.

25. A vehicle braking device having in combination a set of brakes for one pair of wheels of said vehicle, the brake for each of said wheels comprising a drum and a plurality of brake shoes for engaging the same, said shoes being arranged for some movement substantially circumferentially of said drum when brought into frictional engagement therewith, a chamber containing fluid, plungers acting on said fluid and movable by said fluid connected respectively to said shoes, means connecting said chambers, means connected to said means for exerting pressure on said fluid to move said shoes into frictional engagement with said drum, a fluid cylinder for each of said drums, plungers in said cylinders connected respectively to said shoes so that movement of said shoes will exert pressure on the fluid in said cylinders, a fluid-containing conduit connecting said fluid cylinders, a second set of brakes for another pair of wheels of said vehicle, each brake comprising a drum, a plurality of shoes movable in a frictional engagement therewith, said shoes being arranged for some movement substantially circumferentially of said drum when brought into frictional engagement therewith, a primary fluid chamber and a secondary fluid chamber in each of said latter drums, plungers in said primary and secondary fluid chambers connected to said shoes respectively in said second set of brakes, means connecting said primary fluid chambers to said fluid containing conduit, whereby the pressure transmitted to said primary chambers acts on said shoes and said shoes act on the fluid in said secondary chambers to further apply said brakes.

26. In a friction brake mechanism the combination with a rotary brake drum and primary and secondary segmental brake shoes arranged in circumferentially spaced relation within the drum and normally spaced therefrom, a pair of cylinders, a pair of pistons for each cylinder, each pair of pistons being spaced in their respective cylinders to afford an intermediate compression chamber, means for connecting one piston of each pair thereof to the end portion of one of said shoes, means connecting the other piston of each pair thereof to the adjacent end of the other of said shoes, and means comprising a pair of pistons concentric with one of said pairs of pistons for transferring the anchor load from either of said shoes to the other of said shoes.

ROY C. HOYT.